United States Patent [19]
Idel et al.

[11] Patent Number: 4,525,579
[45] Date of Patent: Jun. 25, 1985

[54] PROCESS FOR THE PRODUCTION OF OPTIONALLY BRANCHED POLYARYLENE SULPHIDES WITH POLYHALOGENATED POLYAROMATIC COMPOUND

[75] Inventors: Karsten Idel, Krefeld; Edgar Ostlinning, Duesseldorf; Wolfgang Koch, Bischoffen; Walter Heitz, Kirchhain, all of Fed. Rep. of Germany

[73] Assignee: Bayer Aktiengesellschaft, Leverkusen, Fed. Rep. of Germany

[21] Appl. No.: 592,420

[22] Filed: Mar. 23, 1984

[30] Foreign Application Priority Data

Apr. 5, 1983 [DE] Fed. Rep. of Germany ....... 3312254

[51] Int. Cl.³ ............................................. C08G 75/16
[52] U.S. Cl. ..................................... 528/388; 528/86; 528/226
[58] Field of Search .......................... 528/388, 86, 226

[56] References Cited

U.S. PATENT DOCUMENTS 3,268,504  8/1966  Harris et al. ........................ 528/388

Primary Examiner—Harold D. Anderson
Attorney, Agent, or Firm—Connolly and Hutz

[57] ABSTRACT

This invention relates to a new process for the production of optionally branched polyarylene sulphides from optionally substituted halogen benzenes in admixture with aromatic polyhalogen compounds and alkali metal sulphides in polar solvents, with the addition of reducing agents and other polyhalogenated compounds.

9 Claims, No Drawings

PROCESS FOR THE PRODUCTION OF OPTIONALLY BRANCHED POLYARYLENE SULPHIDES WITH POLYHALOGENATED POLYAROMATIC COMPOUND

This invention relates to a new process for the production of optionally branched polyarylene sulphides from optionally substituted halobenzenes in admixture with aromatic polyhalogen compounds and alkali metal sulphides in polar solvents, with the addition of reducing agents and other polyhalogenated compounds.

Polyarylene sulphides are known (see U.S. Pat. Nos. 2,538,941 and 2,513,188). They may be obtained from the corresponding aromatic halogen compounds and alkali metal or alkaline earth metal sulphides. Thus, monomeric and polymeric sulphides may be produced according to the process described in U.S. Pat. No. 3,354,129, for example, involving reacting at least one cyclic compound which contains a double bond between adjacent ring atoms and is substituted by at least one halogen atom with an alkali metal sulphide in a polar solvent. Polyhalogen compounds may be used as branching agents.

The use of carboxylates as reaction accelerators and the additional use of thio compounds as sulphur donors have been disclosed in DE-AS No. 2,453,749. The use of lithium chloride or lithium carboxylates as catalysts for the production of arylene sulphide polymers is known from DE-OS No. 2,623,363 and U.S. Pat. No. 4,038,261.

According to U.S. Pat. No. 4,038,259, alkali metal carbonates are used in combination with alkali metal carboxylates as catalysts for the production of polyphenylene sulphides and according to U.S. Pat. No. 4,038,263 lithium halides are used as catalysts for this purpose. According to DE-OS No. 2,623,362 and U.S. Pat. No. 4,038,262, lithium halides or alkali metal carboxylates are used together with carbon dioxide as catalysts for the production of arylene sulphide polymers.

In addition, U.S. Pat. No. 4,038,260, for example, discloses the use of alkali metal sulphonates and U.S. Pat. No. 4,039,518 the use of lithium carbonate and lithium borate as catalysts.

According to U.S. Pat. No. 4,096,132, straight-chain p-polyphenylene sulphides having a slightly increased melt viscosity are obtained if the reaction is carried out in the presence of an alkali metal carboxylate, preferably lithium acetate, and alkali metal hydroxides.

Polyarylene sulphides having reduced melt flow may be obtained by using trialkali metal phosphate catalysts (DE-OS No. 2,930,710) or alkali metal phosphonate catalysts (DE-PS No. 2,930,797).

According to DE-OS No. 2,623,333, the water of hydration of the lithium acetate catalyst is removed first and the water of hydration of the sodium sulphide hydrate is removed in a second step.

From U.S. Pat. No. 4,178,433 it is known to use $S_2Cl_2$ or $S_2Br_2$ to obtain polyarylene sulphides which are free from disulphides.

The p-polyphenylene sulphides are generally subjected to a stage of hardening or curing by means of a chain-lengthening and branching reaction (e.g. U.S. Pat. Nos. 3,727,620; 3,524,835 and 3,839,301). Without this hardening step, the polyphenylene sulphides generally have a low melt viscosity which is unsuitable for thermoplastic processing.

According to U.S. Pat. No. 3,919,177, the use of lithium carboxylates as catalysts enables the p-polyphenylene sulphide produced to be spun into fibres by melt spinning without previous hardening. U.S. Pat. No. 4,116,947 and DE-OS No. 2,817,731 describe how a certain quantity of residual water enables the polyphenylene sulphides to be spun into fibres and extruded, as well as pressure moulded without a hardening step.

The present invention is based on the finding that polyarylene sulphides having a high melt viscosity and high molecular weight may be obtained by condensing di- and higher poly-halogen benzenes and alkali metal sulphides in certain polar solvents in known manner and then adding from 1 to 50 mol-%, preferably from 1 to 25 mol-%, (based on 1 mol of alkali metal sulphide), of a reducing agent and from 1 to 50 mol-%, preferably from 1 to 25 mol-%, of a polyhalogen compound towards the end of the reaction.

The polyarylene sulphides obtained have the advantage compared with known polyarylene sulphides of having no corrosive effect on metals up to a temperature of 350° C. They also have better mechanical properties than the conventional commercially available polyarylene sulphides.

The present invention relates to a process for the production of optionally branched, high molecular weight polyarylene sulphides having a high melt viscosity, characterised in that:

(a) dihalogen benzenes, of which from 0 to 100 mol-%, preferably from 50 to 100 mol-%, correspond to the following general formula (I):

and from 0 to 100 mol-%, preferably from 0 to 50 mol-% correspond to the following general formula (II):

wherein
 X represents chlorine or bromine (in meta- or para-positions to each other); and
 $R^1$, which may be the same or different, represents hydrogen, $C_1$-$C_{20}$ alkyl, $C_5$-$C_{20}$ cycloalkyl, $C_6$-$C_{24}$ aryl, $C_7$-$C_{24}$ alkaryl or $C_7$-$C_{24}$ aralkyl; and groups $R^1$ which are in the ortho-position to each other may be joined together to form an aromatic or heterocyclic 6-membered ring which may contain up to three hetero atoms, such as O, N or S, and at least one $R^1$ represents a substituent other than hydrogen; and (b) from 0 to 3.0 mol-%, preferably from 0.4 to 2.0 mol-%, based on the sum of the aromatic dihalogen compounds (I) and (II), of an aromatic trihalogen or tetrahalogen compound corresponding to the following general formula (III)

$$ArX_n \qquad \text{(III)}$$

wherein

Ar represents an aromatic or heterocyclic residue having from 6 to 24 carbon atoms in which up to three ring carbon atoms may be replaced by hetero atoms, such as N, O or S;

X represents chlorine or bromine; and n represents 3 or 4;

(c) alkali metal sulphides, preferably sodium or potassium sulphide or mixtures thereof, preferably in the form of hydrates or aqueous mixtures, optionally together with alkali metal hydroxides, such as sodium or potassium hydroxide; the molar ratio of (a+b): c being from 0.85:1 to 1.15:1, preferably from 0.95:1 to 1.05:1;

(d) in a polar solvent, optionally in the presence of further cosolvents and optionally in the presence of catalysts, with the molar ratio of (c) to (d) being from 1:2 to 1:15, are reacted with from 1 to 50 mol-%, preferably from 1 to 25 mol-%, (based on the molar quantity of alkali metal sulphide), of a reducing agent and from 1 to 50 mol-%, preferably 1 to 25 mol-%, of a compound corresponding to the following general formula (IV)

$$X_mAr-Y-ArX_m \qquad \text{(IV)}$$

wherein

Ar and X are as defined in connection with formula (III); and

Y represents a single bond, oxygen, sulphur, $$-SO_2-, \; -\underset{\underset{O}{\|}}{C}- \; \text{or} \; -(CR^1R^2)_m-$$

wherein $R^1$ and $R^2$ represent hydrogen or an alkyl group having from 1 to 6 carbon atoms; and m represents an integer of from 1 to 4, preferably 2; the sum of (I), (II) and (IV) mounting to 100 mol-%, based on the mols of alkali metal sulphide.

The following are example of aromatic dihalogen compounds (I) which may be used according to the present invention: m-dichlorobenzene, p-dichlorobenzene, p-dibromobenzene, m-dibromobenzene and 1-chloro-4-bromobenzene. These may be used either singly or as mixtures with each other.

The following are examples of aromatic dihalogen compounds (II) which may be used according to the present invention: 2,5-dichlorotoluene, 2,5-dichloroxylene, 1-ethyl-2,5-dichlorobenzene, 1-ethyl-2,5-dibromobenzene, 1-ethyl-2-bromo-5-chlorobenzene, 1,2,4,5-tetramethyl-3,6-dichlorobenzene, 1-cyclohexyl-2,5-dichlorobenzene, 1-phenyl-2,5-dichlorobenzene, 1-benzyl-2,5-dichlorobenzene, 1-phenyl-2,5-dibromobenzene, 1-p-tolyl-2,5-dichlorobenzene, 1-p-tolyl-2,5-dibromobenzene and 1-hexyl-2,5-dichlorobenzene. These may be used singly or in admixture with each other.

The following are examples of aromatic trihalogen and tetrahalogen compounds (III) which may be used according to the present invention: 1,2,3-trichlorobenzene, 1,2,4-trichlorobenzene, 1,2,4-tribromobenzene, 1,3,5-trichloro-1,4,6-trimethylbenzene, 1,2,3-trichloronaphthalene, 1,2,4-trichloronaphthalene, 1,2,6-trichloronaphthalene, 2,3,4-trichlorotoluene, 2,4,6-trichlorotoluene, 1,2,3,4-tetrachloronaphthalene, 1,2,4,5-tetrachlorobenzene, 2,2',4,4'-tetrachlorobiphenyl and 1,3,5-trichlorotriazine.

The following are examples of polyhalogenated compounds (IV) which may be used according to the present invention: bis-(4-chlorophenyl)-ether, bis-(4-chlorophenyl)-sulphide, bis-(4-bromophenyl)-sulphide, bis-(4-chlorophenyl)-sulphone, bis-(4-bromophenyl)-sulphone, bis-(4-chlorophenyl)-ketone, bis-(4-chlorophenyl)-methane, 2,2-bis-(p-chlorophenyl)-propane, 4,4'-dichlorobenzenebiphenyl, 4,4'-dibromophenyl, 2,6-dichloropyridine and 2,5-dichlorothiophene.

When addition of the polyhalogen compounds takes place, from 1 to 50 mol-%, preferably from 1 to 25 mol-%, of other bases, e.g. alkali metal hydroxides, such as NaOH or KOH, or from 0.5 to 25 mol-%, preferably from 0.5 to 12.5 mol-%, of carbonates, such as $Na_2CO_3$, based on the quantity of alkali metal sulphide used, may also be added.

The alkali metal sulphides, preferably potassium and sodium sulphide, are preferably used in the form of hydrates or aqueous solutions, but they may also be produced directly from hydrogen sulphide and the corresponding alkali metal hydroxides or from alkali metal hydrogen sulphides and the corresponding alkali metal hydroxides by a stoichiometric reaction in the reaction solution. Mixtures of alkali metal sulphides may also be used.

Depending on the quantity of alkali metal hydrogen sulphide present in the reaction solution, either as impurity in the alkali metal sulphide or formed during the reaction, an additional, stoichiometric quantity of alkali metal hydroxide, such as lithium, sodium or potassium hydroxide, is added to regenerate the alkali metal sulphide. Instead of using alkali metal hydroxides, compounds which release or form alkali metal hydroxides under the reaction conditions may be added.

The following are examples of reducing agents which may be used according to the present invention: complex hydrides, such as sodium borohydride, lithium aluminium hydride and dibutyl aluminium hydride, sulphites such as sodium sulphite, hypophosphites, such as sodium hypophosphite, sugars which have a reducing action under the reaction conditions, hydrogen and hydrazine hydrate. The substances mentioned may be used either singly or in admixture with each other.

Various polar solvents providing sufficient solubility of the organic and inorganic reactants under the reaction conditions may generally be used for the reaction, but amides, lactams and ureas are preferred, N-alkylated amides, lactams and cyclic ureas being particularly preferred.

"Lactams" for the present purposes are amino acids having from 3 to 5 carbon atoms optionally carrying on the carbon structure substituents which are inert under the reaction conditions, e.g. alkyl groups having from 1 to 5 carbon atoms.

The N-alkyl lactams which may be used for the purposes of the present invention conform to the same definition as the lactams according to the present invention, but carry in addition an alkyl group having from 1 to 6 carbon atoms on the nitrogen atom.

"Ureas" for the present purposes include tetraalkylated ureas corresponding to the following general formula (IV):

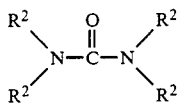

wherein
R², which may be the same or different, represents a C₁-C₄ alkyl group; and
cyclic ureas corresponding to the following general formula (VII):

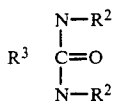

wherein
R² is as defined above and preferably represents methyl; and
R³ represents an ethylene or propylene group, optionally substituted.

The following are mentioned as examples: N,N-dimethylformamide, N,N-diethylacetamide, N,N-dipropylacetamide, N,N-dimethylbenzoic acid amide, caprolactam, N-methylcaprolactam, N-ethylcaprolactam, N-isopropylcaprolactam, N-isobutylcaprolactam, N-propylcaprolactam, N-butylcaprolactam, N-cyclohexylcaprolactam, N-methyl-2-pyrrolidone, N-ethyl-2-pyrrolidone, N-isopropyl-2-pyrrolidone, N-isobutyl-2-pyrrolidone, N-propyl-2-pyrrolidone, N-butyl-2-pyrrolidone, N-cyclohexyl-2-pyrrolidone, N-methyl-3-methyl-2-pyrrolidone, N-cyclohexyl-2-pyrrolidone, N-methyl-3-methyl-2-pyrrolidone, N-methyl-3,4,5-trimethyl-2-pyrrolidone, N-methyl-2-piperidone, N-ethyl-2-piperidone, N-isopropyl-2-piperidone, N-isobutyl-2-piperidone, N-methyl-6-methyl-2-piperidone, N-methyl-3-ethyl-2-piperidone, N-methyl-2-oxohexamethylene imine, N-ethyl-2-oxo-hexamethylene imine, tetramethylurea, 1,3-dimethylethylene urea and 1,3-dimethyl-propylene urea.

Mixtures of the above-mentioned solvents may be used.

The quantity of solvent used may be chosen within a wide range and is generally from 2 to 15 mol per mol of alkali metal sulphide.

The reaction temperature is generally from 160° to 300° C., preferably from 200° to 285° C. The reaction time may be up to 10 hours and is preferably from 0.2 to 8 hours. It may be advantageous to increase the reaction temperature stepwise during this time.

The dihalogen benzene and alkali metal sulphide are reacted in approximately equimolar proportions. The molar ratio of dihalogen benzene to alkali metal sulphide is from 0.85:1 to 1.15:1, preferably from 0.95:1 to 1.05:1.

The aromatic polyhalogen compounds (III) may be used according to the present invention in quantities of up to several mol-%, based on the quantity of dihalogen benzene, and may be added separately or together with the p-dihalogen benzenes, depending on the experimental conditions. A proportion of aromatic polyhalogen compounds of from 0.2 to 3.0 mol-%, preferably from 0.4 to 2.0 mol-%, based on the quantity of dihalogen benzene, will generally be sufficient.

When aromatic polyhalogen compounds are used, branched polyarylene sulphides are obtained.

The process according to the present invention may be carried out as follows:

The alkali metal sulphides are introduced into the reaction vessel in a solvent and may then be dehydrated in one or more steps, for example by removal of water from the solution by distillation. It is generally advantageous to carry out a partial dehydration before addition of the dihalogen compounds.

The reactants may in principle be added together in any desired sequence. The aromatic dihalogen compounds (I) and (II) and the aromatic polyhalogen compounds (III) and (IV) may be added to the alkali metal sulphide and solvent or to a part thereof either together or separately, continuously or portionwise or directly all at once. Alternatively, the alkali metal sulphide together with the solvent or part of the solvent may be added to the compounds (I) and (II) and the aromatic polyhalogen compounds (III) and (IV), or all the reactants may be brought together at the same time. Other combinations of addition of reactants may also be employed.

The reducing agent and polyhalogen compound (III) and/or (IV) may also be added together or separately in any sequence, all at once, portionwise or continuously, optionally dissolved in the solvent used for the reaction.

After addition of the reducing agent and the polyhalogen compound (III) and/or (IV), the reaction temperature is maintained for a further period which is preferably from two to nine times as long as the period up to the point of addition of the reducing agent and the polyhalogen compound (III) and/or (IV). After completion of the reaction, the reaction mixture may be worked-up in the conventional manner to isolate the polyarylene sulphides.

The polyarylene sulphide may be removed from the reaction solution by the conventional methods of filtration or centrifugation, either immediately or after the addition of, for example, water and/or dilute acids. The separated polyarylene sulphides are then washed, e.g. with water.

Washing or extraction may also be carried out with other washing liquids, either in addition to or subsequent to the washing with water.

The polymer may also be recovered by evaporation of the solvent from the reaction chamber, followed by washing, as described above.

The polyarylene sulphides according to the present invention may be mixed with other polymers, pigments, fillers, such as graphite, metal powder, glass powder, quartz powder or glass fibres, or the conventional additives for polyarylene sulphides, such as stabilizers and mould release agents.

The melt flow properties of the polyarylene sulphides, expressed in g/10 min, may be determined according to ASTM 1238-70 at 316° C., using a 5 kg weight.

If the melt flow values are high, however, this method of measurement may cause difficulties due to the high outflow rates of the polymer melt.

The method of determining the melt viscosity nm of the polymer melt (mPa.s) at 306° C. in dependence upon the shearing stress $\tau$ (in Pa) has therefore been employed using an Instron Rotation viscosimeter. This enables the melt viscosity to be determined over a very wide range of from $10^{-1}$ to $10^7$ Pa.s. In the Instron-Rheometer, the polymer is melted between a fixed plate and a rotatable cone and the torque of the cone is determined. The torque angular velocity and data of the apparatus may then be used to calculate the melt viscosity in dependence upon the shearing stress. A rheometer Model 3250 of Instron was used, diameter of cone and of plate 2 cm.

The melt viscosity found at a shearing stress of $\tau = 10^2$ Pa is indicated.

Immediately after isolation from the reaction mixture, the polyarylene sulphides according to the present invention generally have melt viscosities of from $0.5 \times 10^3$ to $5 \times 10^6$ Pa.s, preferably from $1.5 \times 10^3$ to $10^4$ Pa.s. They may be worked-up directly by extrusion, extrusion blowing, injection moulding or other conventional techniques to produce foils, moulded articles or fibres. These products may be used for the conventional purposes, e.g. as motor car parts, dashboards, electrical equipment, such as switches, electronic panels, chemically-resistant parts and apparatus, such as pump housings and pump impellors, dishes for etching baths, sealing rings, parts of office machines and telecommunication devices, as well as domestic appliances, valves, ball-bearing parts.

EXAMPLE 1

(Comparison Example according to U.S. Pat. No. 3,354,129)

129 g of sodium sulphide trihydrate (corresponding to 1 mol of Na$_2$S) and 300 g of N-methyl-2-pyrrolidone were introduced into an autoclave equipped with stirrer. The mixture was purged with nitrogen and slowly heated to 202° C. 19 ml of water slowly distilled off. The reaction mixture was then cooled to about 160° C. and 147 g of p-dichlorobenzene (1 mol) in about 50 g of N-methyl-2-pyrrolidone were added. The reaction mixture was heated to 245° C. in 30 minutes under the initial nitrogen pressure of 2.5 bar, the pressure rising during this heating to 10 bar, and this temperature was maintained for 3 hours. After cooling to room temperature, a grey solid was isolated and carefully washed with water.

The produce was dried under vacuum at 80° C. and 100.3 g (93%) of poly-p-phenylene sulphide having the following characteristics were obtained: Melt viscosity $\eta m = 4.5$ Pa.s (at $\tau = 10^2$ Pa). Thermoplastic processing was not possible without hardening.

EXAMPLE 2

(Comparison Example according to U.S. Pat. No. 4,096,132)

130.1 g of sodium sulphide hydrate (corresponding to 1 mol of Na$_2$S), 101.2 g of lithium acetate dihydrate (0.99 mol), 9.2 g of NaOH (0.23 mol) and 400 ml of N-methylpyrrolidone (2) were introduced into an autoclave equipped with stirrer. The mixture was purged with nitrogen and slowly heated to 202° C. The distillate obtained consisted mainly of H$_2$O. 150.3 g of p-dichlorobenzene (1.02 mol) and about 70 ml of N-methylpyrrolidone (2) were added to the remaining reaction mixture. The reaction mixture was heated to 266° C. and maintained at this temperature for 3 hours. The product obtained after working-up consisted of 87.5 g (81.2%) of a light grey poly-p-phenylene sulphide having a melt viscosity of $\eta m = 15$ Pas. (at $\tau = 10^2$ Pa). Thermoplastic processing was not possible without hardening.

EXAMPLE 3

Model reaction 4.37 g of diphenyl disulphide (20 mmol), 5.74 g of bis-(4-chlorophenyl)-sulphone (20 mmol), 0.83 g of NaBH$_4$ (22 mol), 2.12 g of Na$_2$CO$_3$ (20 mmol) and 30 ml of N-methyl-2-pyrrolidone were introduced into a glass autoclave equipped with stirrer. The mixture was purged with nitrogen and heated to 240° C. for 3 hours, during which time the pressure rose to 3.3 bar.

After the reaction solution had cooled to room temperature, the reaction product was precipitated by introducing the reaction solution dropwise into 200 ml of methanol and was then purified by recrystallisation from 130 ml of ethanol. The yield of purified bis-(4-phenylthio-phenyl) sulphone was 6.82 g (78.5% of the theoretical yield). The melting point of the substance was 152° C.

EXAMPLE 4

Model reaction

The same as Example 3, but using 8.69 g of bis-[4-(phenylthio)phenyl]-disulphide (20 mmol). The yield of bis-[4-{(4-(phenylthio)-phenyl)thio}phenyl]-sulphone was 11.2 g (86.0% of theoretical yield). The melting point of the substance was 181° C. (from ethanol/-chloroform=4/1).

EXAMPLE 5

191.6 g of sodium sulphide hydrate (1.455 mol) and 13.3 g of a 45% aqueous sodium hydroxide solution (for neutralisation of the sodium hydrogen sulphide present in the sodium sulphide) were together introduced into 450 g of N-methylpyrrolidone under nitrogen in a steel autoclave equipped with stirrer.

46 ml of a distillate consisting mainly of water were obtained by slow heating to 175° C.

187.4 g of p-dichlorobenzene (1.275 mol) and 1.63 g (0.009 mol) of 1,2,4-trichlorobenzene in 70 ml of N-methyl-pyrrolidone were then added and the reaction was carried out for 4 hours at 240° C. under about 15 bar. 14.4 g of an aqueous 50% hydrazine solution (0.255 mol) in water in 50 ml of N-methylpyrrolidone and 64.6 g (0.255 mol) of 4,4'-dichlorodiphenylsulphone together with 100 ml of N-methylpyrrolidone were then pumped in and the reaction was continued for a further ½ hour. At the end of the reaction, the temperature was allowed to fall to 150° C., the pressure was released and the reaction mixture was removed. After acidification of the reaction mixture to pH 6.5, the polyarylene sulphide sulphone could be isolated by filtration. The product was washed neutral with water, filtered and dried, and the polymer was isolated as a grey white solid. Melt viscosity $\tau_m = 6.4 \times 10^3$ Pa.s (determined at $10^2$ Pa).

EXAMPLE 6

Same as Example 5, but using 0.255 mol of sodium borohydride instead of 0.225 mol of hydrazine hydrate.

The product isolated is polyarylene sulphide sulphone having a melt viscosity of $5.8 \times 10^3$ Pa.s (determined at $10^2$ Pa).

EXAMPLE 7

Same as Example 5, but using 198.4 g (1.35 mol) of p-dichlorobenzene, 86.1 g (0.3 mol) of 4,4'-dichlorodiphenylsulphone and 18.9 g of 50% aqueous hydrazine (0.3 mol) in the same manner as in Example 5.

The polyarylene sulphide sulphone obtained has a melt viscosity of $5.4 \times 10^3$ Pa.s (determined at $10^2$ Pa).

EXAMPLE 8

Same as Example 5, but using 0.225 mol of p-dichlorobenzene instead of 0.225 mol of 4,4'-dichlorodiphenylsulphone. The p-polyphenylene sulphide isolated has a melt viscosity of $5.2 \times 10^3$ Pa.s (determined at $10^2$ Pa).

We claim:

1. A process for the production of high molecular weight polyarylene sulphides having a high melt viscosity wherein:

(a) at least one dihalogen benzene, of which from 0 to 100 mol-% correspond to formula (I):

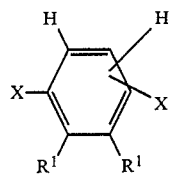
   (I)

and from 100 to 0 mol-% correspond to formula (II):

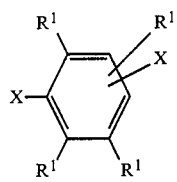
   (II)

X represents chlorine or bromine in the meta- or para-position to each other; and $R^1$ which is the same or different, represents hydrogen, $C_1$–$C_{20}$ alkyl, $C_5$–$C_{20}$ cycloalkyl, $C_6$–$C_{24}$ aryl, $C_7$–$C_{24}$ alkaryl or $C_7$–$C_{24}$ aralkyl; and two groups $R^1$ in the ortho-position to each other when joined together form an aromatic or heterocyclic 6-membered ring having up to three O, N or S, hetero atoms, and one group $R^1$ is other than hydrogen; and (b) from 0 to 3.0 mol-%, based on the sum of the aromatic dihalogen compounds (I) and (II), of an aromatic trihalogen or tetrahalogen compound corresponding to formula (III):

$$ArX_n \qquad (III)$$

wherein

Ar represents an aromatic or heterocyclic group having from 6 to 24 carbon atoms and in which up to three ring carbon atoms are replaced by N, O or S hetero atoms;

X represents chlorine or bromine; and n represents 3 or 4;

(c) at least one alkali metal sulphide with the molecular ratio of (a+b):c being from 0.85:1 to 1.15:1;

(d) in a polar solvent with the molar ratio of (c) and (d) being from 1:2 to 1:15, are reacted together with (e) from 1 to 50 mol-%, based on the molar quantity of alkali metal sulphide, of a reducing agent and (f) from 1 to 50 mol-% of a compound corresponding to formula (IV):

$$X_m Ar\text{—}Y\text{—}ArX_m \qquad (IV)$$

Ar and X are as defined above in formula (III); and Y represents a single bond or Y represents oxygen, sulphur,

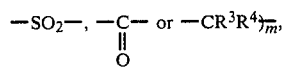

wherein $R^3$ and $R^4$ represent hydrogen or an alkyl group having from 1 to 6 carbon atoms; and m represents an integer of from 1 to 4;

the sum of (I), (II) and (IV) amounting to 100 mol-%, based on the mols of alkali metal sulphide.

2. Process according to claim 1 wherein component (a) is p-dichlorobenzene or p-dibromobenzene.

3. Process according to claim 1 wherein the amount of compound (III) is 0 to 2.0 mol-%.

4. Process according to claim 1 wherein the reducing agent (e) amounts to 1 to 25 mol-%, based on the mols of alkali metal sulphide, and compound (IV) amounts to from 1 to 15 mol-% of a reactive di- or polyhalogenated compound (IV).

5. A process according to claim 1 wherein the solvent is an amide completely alkylated on the nitrogen, lactam, a cyclic urea completely alkylated on the nitrogen, or their mixtures.

6. A process according to claim 1 wherein the high molecular weight polyarylene sulphides are branched.

7. A process according to claim 1 wherein the component (c) additionally contains at least one alkali metal hydroxide.

8. A process according to claim 1 wherein component (d) also contains at least one cosolvent.

9. A process according to claim 1 wherein component (d) also contains a catalyst.

* * * * *